(12) United States Patent
Allen et al.

(10) Patent No.: US 7,045,710 B1
(45) Date of Patent: May 16, 2006

(54) ENCLOSURE FOR TELECOMMUNICATION LINES AND SPLICES

(75) Inventors: William G. Allen, Austin, TX (US); Larry R. Cox, Austin, TX (US); Rutesh D. Parikh, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/216,593

(22) Filed: Aug. 31, 2005

(51) Int. Cl.
*H02G 3/08* (2006.01)
(52) U.S. Cl. .......................... 174/50; 174/38; 385/135
(58) Field of Classification Search ................ 174/50, 174/38; 385/134–137; 439/535; 220/4.02; 248/906
See application file for complete search history.

(56) References Cited

U.S. PATENT DOCUMENTS

| 5,097,529 A | 3/1992 | Cobb et al. |
|---|---|---|
| 5,131,066 A | 7/1992 | Foss |
| 5,774,618 A | 6/1998 | Jones |
| 5,790,739 A * | 8/1998 | Strause .................. 385/135 |
| 6,014,490 A | 1/2000 | Canning et al. |
| 6,304,707 B1 | 10/2001 | Daems et al. |
| 6,411,767 B1 | 6/2002 | Burrous et al. |
| 6,434,313 B1 | 8/2002 | Clapp, Jr. et al. |
| 6,496,640 B1 | 12/2002 | Harvey et al. |
| 6,507,691 B1 | 1/2003 | Hunsinger et al. |
| 6,539,160 B1 | 3/2003 | Battey et al. |
| 6,621,975 B1 | 9/2003 | Laporte et al. |
| 6,778,752 B1 | 8/2004 | Laporte et al. |
| 6,856,747 B1 | 2/2005 | Cloud et al. |
| 2004/0256138 A1 | 12/2004 | Grubish et al. |

\* cited by examiner

*Primary Examiner*—Dhiru R. Patel
(74) *Attorney, Agent, or Firm*—Gregg H. Rosenblatt

(57) ABSTRACT

An enclosure includes a housing longitudinally extending from an open first end to a closed second end. The housing defines an internal cavity extending in the longitudinal direction, the internal cavity having a circumference in a direction transverse to the longitudinal direction. A base member is configured for separable attachment to the open first end of the housing to provide an enclosed configuration. A support frame is secured to the base member and extends longitudinally within the internal cavity of the housing in the enclosed configuration. The support frame includes at least one portion that provides support about substantially the entire circumference of the internal cavity at a location between the first end and the second end of the housing.

20 Claims, 12 Drawing Sheets

ENCLOSURE FOR TELECOMMUNICATION LINES AND SPLICES

THE FIELD OF THE INVENTION

The present invention relates generally to enclosures for telecommunications cables. More particularly, the invention relates to enclosures for containing telecommunication lines and telecommunication line splices.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, and so on.

At each point where a telecommunication cable is opened, it is necessary to provide some type of enclosure to protect the exposed interior of the cable. Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof. For example, conventional enclosures have re-enterable housings and are designed to incorporate splice trays to assist a craftsman in creating a splice connection between two telecommunication lines. Once all required splices are made, the enclosure is secured to protect the opened portion of the cable from moisture, dust, insects, and other hazards.

After an enclosure is closed and secured, it must satisfy several technical performance requirements to ensure reliable protection of the opened portion of the cable and various other electronic or optical components within the enclosure. For example, the enclosure must satisfy various environmental related requirements, such as corrosion and insect resistance, and must be able to withstand predetermined external pressures and impact forces without failing. Polymer enclosures are generally preferred, as they most easily satisfy the environmental requirements, in addition to being more easily produced. However, polymer materials often have more difficulty satisfying the pressure and impact requirements. According to current performance requirements such as Telcodia GR771, enclosures for some applications (such as hand-hole installations) must be capable of withstanding an external pressure equivalent to a 20 ft. (6.1 m) water-head and an impact force of 100 ft-lbs (13.84 kg-m) without leaking, collapsing, cracking, or otherwise failing. These particular performance requirements are somewhat conflicting, because a rigid enclosure is preferred for satisfying the pressure testing requirement, while a resilient enclosure is preferred for satisfying the impact testing requirement. As a result, enclosures having sufficient rigidity to withstand the external pressure requirements are often so rigid as to crack or shatter when subjected to the impact requirements, while enclosures having sufficient resiliency to withstand the impact requirements often incur substantial deflection that can cause damage to internal components when subjected to the impact and external pressure requirement.

SUMMARY OF THE INVENTION

In one aspect, the invention described herein provides an enclosure for containing telecommunication lines and telecommunication line splices therein. In one embodiment, the enclosure comprises a housing longitudinally extending from an open first end to a closed second end. The housing defines an internal cavity extending in the longitudinal direction, the internal cavity having a circumference in a direction transverse to the longitudinal direction. A base member is configured for separable attachment to the open first end of the housing to provide an enclosed configuration. A support frame is secured to the base member and extends longitudinally within the internal cavity of the housing in the enclosed configuration. The support frame includes at least one portion that provides support about substantially the entire circumference of the internal cavity at a location between the first end and the second end of the housing.

In another embodiment, the enclosure comprises a housing longitudinally extending from an open first end to a closed second end. The housing defines an internal cavity extending in the longitudinal direction, the internal cavity having a circumferential shape in a direction transverse to the longitudinal direction. A base member is configured for attachment to the open first end of the housing to provide an enclosed configuration, and the base member defines at least one port configured for passage of at least one telecommunications cable therethrough. A support basket is connected to the base member, and extends longitudinally within the internal cavity of the housing in the enclosed configuration. The support basket is shaped to substantially conform to a first portion of the circumferential shape of the internal cavity. A support band is secured to the support basket. The support band is shaped to substantially conform to a second portion of the circumferential shape of the cavity, wherein the support basket and the connected support band extend around substantially the entire circumference of the internal cavity.

In another aspect, the invention described herein provides a frame for supporting telecommunication lines and splices within an enclosure. In one embodiment, the enclosure is of the type having a housing longitudinally extending from an open first end to a closed second end and a base member configured for separable attachment to the open first end of the housing to provide an enclosed configuration, wherein the housing defines an internal cavity extending in the longitudinal direction, and wherein the internal cavity has a circumferential shape in a direction transverse to the longitudinal direction. The frame comprises a support basket shaped to substantially conform to a first portion of the circumferential shape of the internal cavity and configured for connection to the base member, wherein the support basket extends longitudinally within the internal cavity of the housing in the enclosed configuration. A support band is secured to the support basket. The support band is shaped to substantially conform to a second portion of the circumferential shape of the cavity, wherein the support basket and support band secured thereto extend around substantially the entire circumference of the internal cavity.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

For purposes of clarity, the invention is described herein as used with telecommunication cables or simply "cables" having one or more telecommunication lines therein. However, such use is exemplary only, and it is understood and intended that the present invention is equally suitable for use with other types of cables including, but not limited to, electrical power cables, optical fiber cables, copper wire cables, coaxial cables, drop lines, branch lines, and distribution lines, to name a few. Similarly, the invention is described herein as used with telecommunication line splices, or simply "splices". However, such use is exemplary only, and it is understood and intended that the present invention is equally suitable for use with other types of interconnections including, but not limited to, splices, connectors, hybrid connectors, and optical or electrical components as are known in the art, to name a few.

Figure 1:
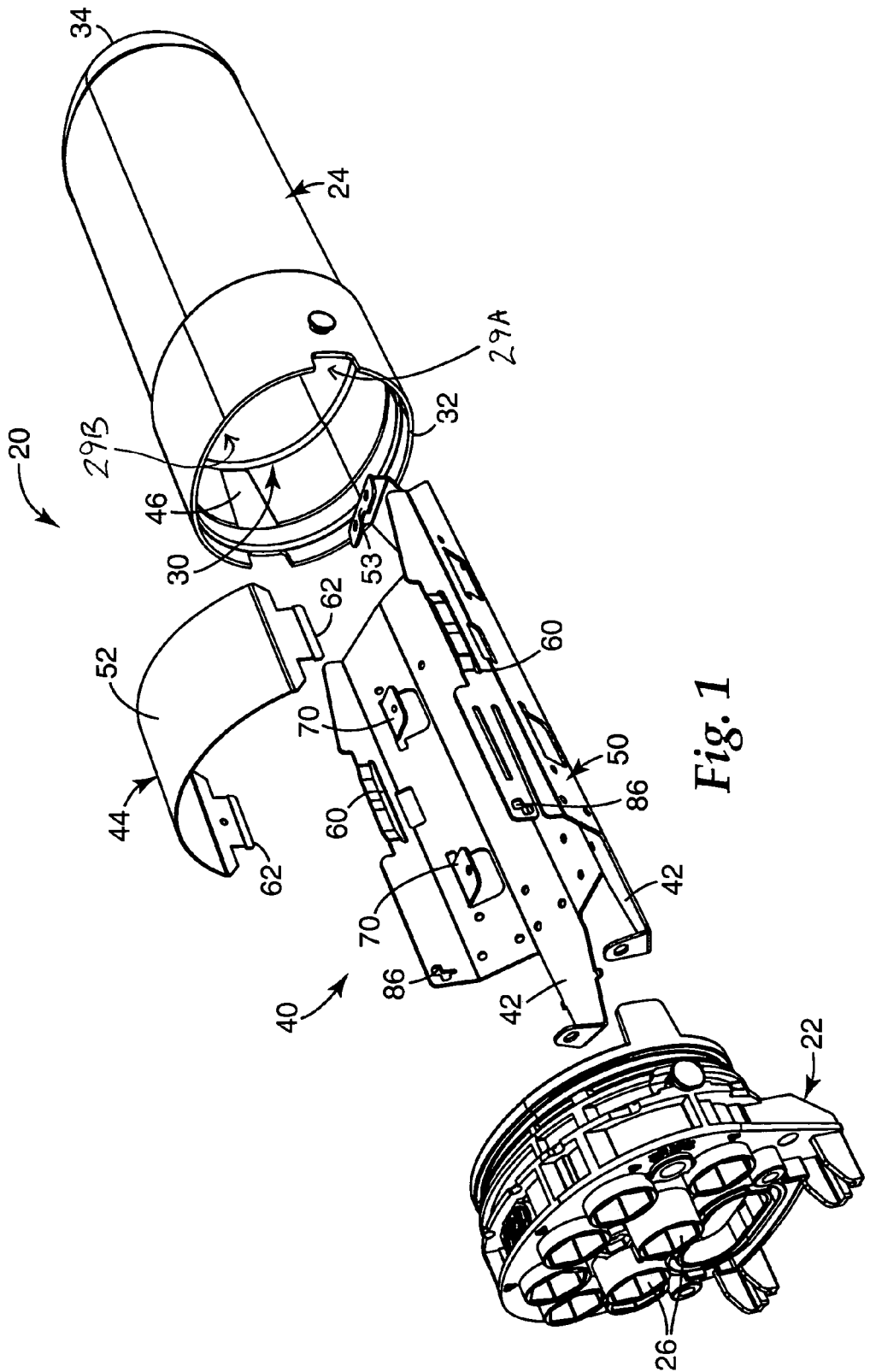
FIG. 1 is an exploded perspective illustration of one embodiment of an enclosure having a support frame according to the invention.
Figure 2:
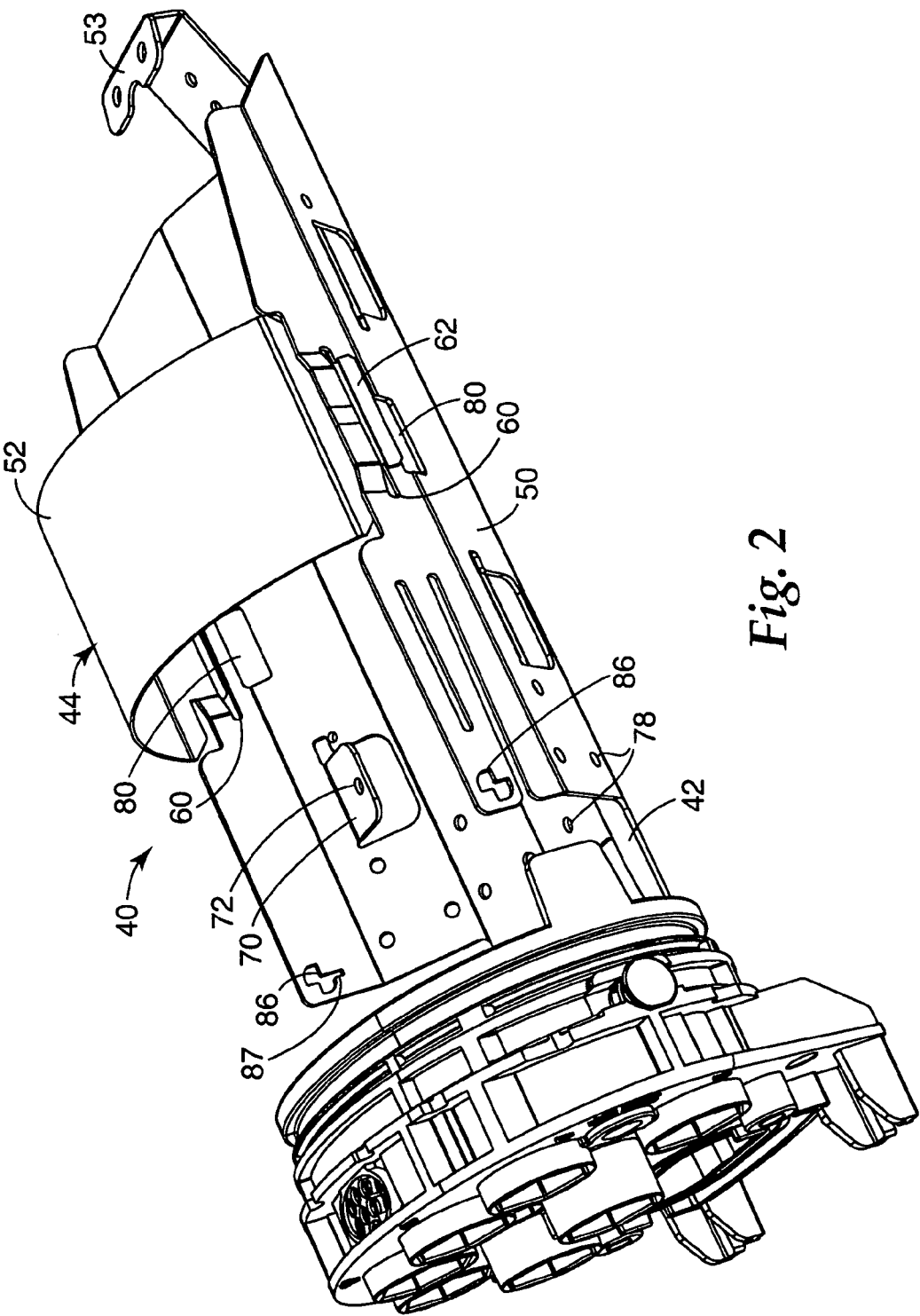
FIG. 2 is a perspective illustration showing the support frame of FIG. 1 attached to a base of the enclosure.

Referring to FIGS. 1 and 2, an exemplary enclosure 20 according to one embodiment of the invention is illustrated in an exploded or disassembled condition. The enclosure 20 includes a base 22 and a housing 24 removeably securable to the base 22. The base 22 includes at least one port 26 for receiving a telecommunications cable (not shown). The ports 26 allow passage of a single cable, or multiple cables in combination with a sealing member as is known in the art. The base 22 may have one, two, or any other number ports 26 as is required for a particular enclosure 20. The housing 24 is hollow and defines a longitudinal internal cavity 30 extending from a first end 32 to a second end 34 of the housing 24. The internal cavity 30 has a circumferential shape in a direction transverse to the longitudinal direction. An opening at the first end 32 of the housing 24 is shaped and sized to fit over and engage with the base 22 in a conventional manner. When engaged, the base 22 and housing 24 provide protection for the internal components of the enclosure 20 from weather, insects and other external hazards.

In the exemplary embodiment, the housing 24 and cavity 30 therein are substantially oval in transverse cross-section, and the closed second end 34 of the housing 24 is substantially dome-shaped. The base 22 has a substantially oval cross-section in the transverse direction that matches the shape of the open end of the housing 24. However, in practice, the shapes of the base 22 and housing 24 are not so limited, and in other embodiments the housing 24 and base 22 may have other shapes and cross-sections. For example, shape of the transverse cross-section of the housing 24 and base 22 may be substantially circular, rectangular, square, or any other shape as is required or desired for a particular application. The closed second end 34 of the housing 24 may likewise be any suitable shape. In other embodiments, the closed second end 34 of the housing 24 is not monolithically formed with the remainder of the housing 24, as shown in the illustrated embodiment. For example, in other embodiments the housing 24 may comprise an assembly of components, such as a longitudinal hollow body having two open ends, wherein a cap or other similar device is used to form the closed second end 34. In one embodiment, the housing 24 is made without internal or external rib members, thereby requiring an increase in housing material (e.g., polymer) strength to meet external pressure requirements, at the expense of a compromised ability to satisfy the impact requirements.

A support frame 40 is secured to the base 22 by one or more mounting bracket portions 42 extending from the frame 40. The mounting bracket portions 42 in the illustrated embodiment are configured to be secured to the base 22 by bolts or screws (not shown). In other embodiments, the support frame 40 may be secured to the base 22 by any conventional means including, but not limited to bolts, screws, interlocking elements on the frame 40 and base 22, adhesive, or any other suitable means. The support frame 40 is shaped to extend longitudinally into the internal cavity 30 of the housing 24 when the enclosure 20 is closed. The support frame 40 includes at least one portion 44 that provides support about substantially the entire circumference of the internal cavity 30 of housing 24 at between the first end 32 and the second end 34 of the housing 24 to prevent excessive deflection or collapse of the housing 24 under excessive force or pressure. In one embodiment, the support frame 40, and in particular portion 44, is configured to be in contact with the walls 46 of the internal cavity 30 to minimize deflection of the housing 24. In another embodiment, the support frame 40, and in particular portion 44, is spaced from the walls 46 of the interior cavity 30 to provide clearance for installation of the housing over the support frame 40 and to allow a predetermined amount of deflection of the housing 24. In one embodiment, the support frame 40 is spaced from the interior walls 46 of the housing 24 by a distance of about 10% or less of the internal diameter of the interior cavity 30. For example, for an internal cavity 30 having an internal diameter of about 8 inches, the frame 40 is spaced from the interior walls 46 by a distance of about 0.8 inches or less.

In one embodiment, mounting bracket portions 42 are integrally formed with support frame 40, such as by stamping frame 40 and mounting bracket portions 42 from a single piece of sheet metal, molding frame 40 and mounting bracket portions 42 as a single unit, or overmolding frame 40 onto mounting bracket portions 42. In another embodiment, mounting bracket portions 42 are separately formed from support frame 40 and then secured to frame 40 using any suitable conventional means, such as screws, bolts, welding, adhesive, etc.

As illustrated in FIGS. 1 and 2, in one embodiment the support frame 40 includes a generally U-shaped support basket 50 having an exterior surface configured to substantially conform to a first portion 29A of the circumferential shape of the internal cavity 30, and a generally U-shaped support band 52 having an exterior surface configured to substantially conform to a second portion 29B of the circumferential shape of the cavity 30. Together, the support basket 50 and the support band 52 provide support about the circumference of the internal cavity 30 of the housing 24 by closely conforming to the circumferential shape of the walls 46 of internal cavity 30. The combined support basket 50 and support band 52 reinforces the walls 46 and provides resistance and limits the deflection of the housing 24 under heavy external pressure, such as caused by water or ice. It also deflects and absorbs impact forces protecting the telecommunication lines and splices therein. The support basket 50 also protects telecommunication lines therein by preventing accidental pinching of the lines during installation of the housing 24 on the base 22.

For purposes of description, the end of the support basket 50 nearest the base 22 will be described as being the "bottom" of the support basket 50, while the end of the support basket 50 furthest from the base 22 will be described as being the "top" of the support basket 50. In the illustrated implementation, the support band 52 is positioned such that it supports the housing 24 near a midpoint along the length of the support basket 50. In other embodiments, the support band 52 is positioned closer to the bottom of the support basket 50 or closer to the top of the support basket 50, depending upon the portion of the housing 24 containing critical telecommunication lines and components that are desired to be protected under external pressure and impact forces. In the illustrated implementation, the support band 52 extends longitudinally along the internal cavity 30 for only a portion of the length of the support basket 50. In other embodiments, the support band 52 may extend longitudinally along up to the full length of the support basket 50. In one embodiment, the top 53 of the support basket 50 may be configured to conform to the shape of the closed second end 34 of the housing 24, and so as to aid in containing and protecting telecommunication lines during installation and removal of the housing 24 from the base 22.

The support basket 50 is configured to manage and protect telecommunication lines and splices therein. In one embodiment, the support basket 50 extends substantially the full length of the internal cavity 30 of the housing 24. In other embodiments, the support basket 50 does not extend the full length of the internal cavity 30. In one embodiment, the support basket 50 conforms to about one half of the circumference of the internal cavity 30. In other embodiments, the support basket 50 conforms to more than about one half of the circumference of the internal cavity 30. In other embodiments, the support basket 50 conforms to less than about one half of the circumference of the internal cavity 30. Although only a single support band 52 is illustrated, more than one support band 52 may be secured to the support basket 50.

The support band 52 may be secured to the support basket 50 using conventional techniques. In one embodiment, the support band 52 is releasably secured to the support basket 50, so as to provide full and easy access to the interior of the support basket 50. For example, in the exemplary embodiment the support basket 50 includes slots 60 shaped to receive tabs 62 extending from the support band 52. The slots 60 and tabs 62 may optionally be provided with interlocking features to prevent inadvertent disengagement of the support basket 50 and the support band 52. During installation or when working within the enclosure 20, the support band 52 can be removed, and then reinstalled prior to securing the enclosure 20. In other embodiments, the support band 52 is permanently secured to the support basket 50. In one embodiment, support band 52 is integrally formed with support basket 50. In one embodiment, the support band 52 is secured to support basket 50 by a hinge member, thereby allowing the support band 52 to be rotated out of the way when access to the interior of the support basket 50 is required. In another embodiment, support band 52 is a separate hoop that slidingly engages and surrounds support basket 50. Those skilled in the art will recognize other suitable configurations and means for securing the support band 52 to the support basket 50.

The support basket 50 is configured to support, maintain and manage telecommunication lines and splices in several different manners, depending upon the requirements of a particular installation. In one implementation, telecommunication lines and splices may simply be positioned within the interior of the generally U-shaped support basket 50, without any other type of telecommunication line management features (such as splice trays, excess line holders, optical/electrical components etc.). In other implementations, telecommunication line management features are used with and incorporated into the support basket 50. For example, the illustrated support basket 50 and support band 52 may be used with different types of splice trays. In particular, the support basket 50 may be used to support stackable trays 66 (FIGS. 3–4) or hinged trays 68 (FIGS. 6–7).

Figure 3:
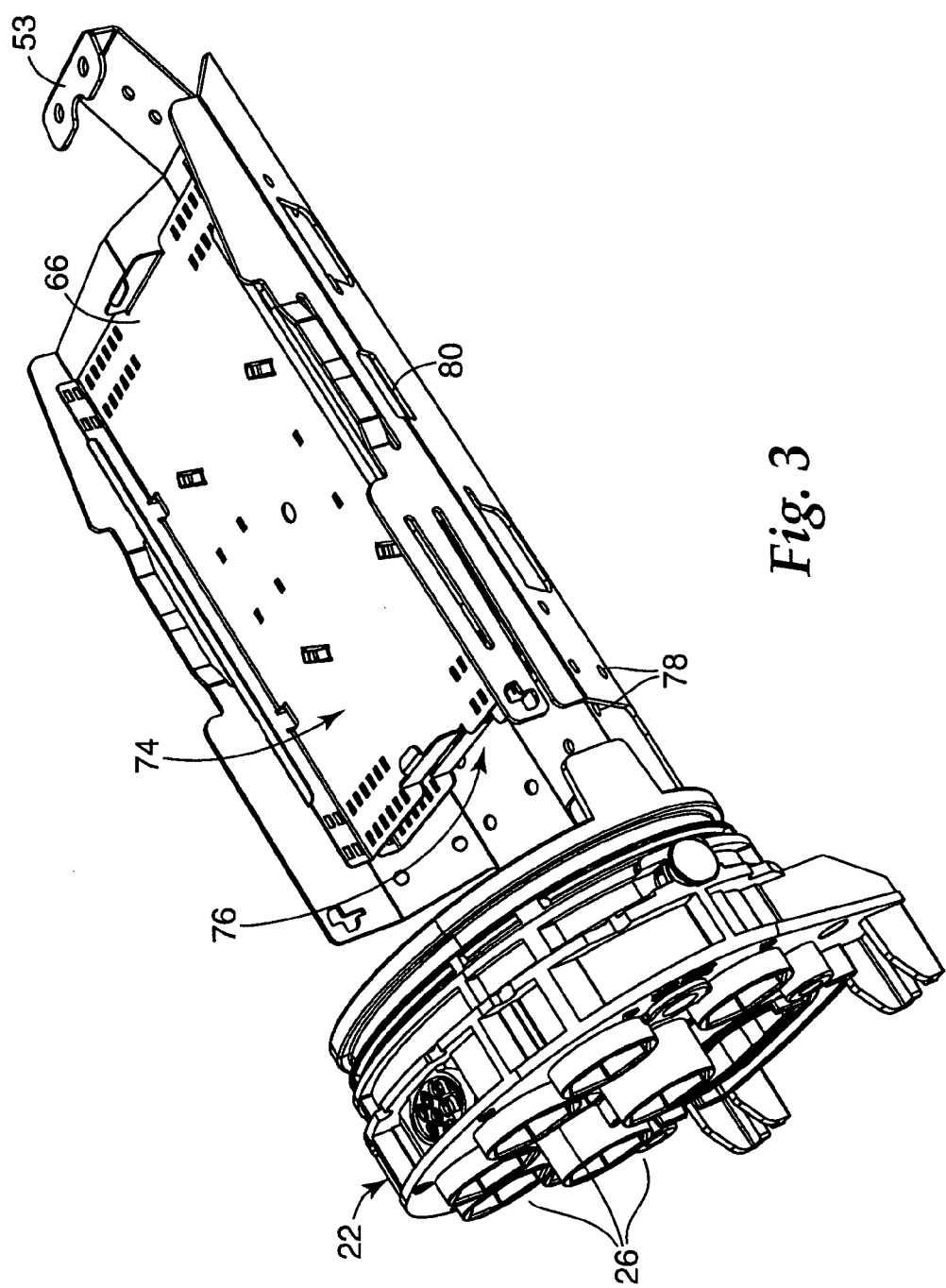
FIG. 3 is a perspective illustration of the support frame and base of FIG. 2 showing splice trays being stacked.
Figure 4:
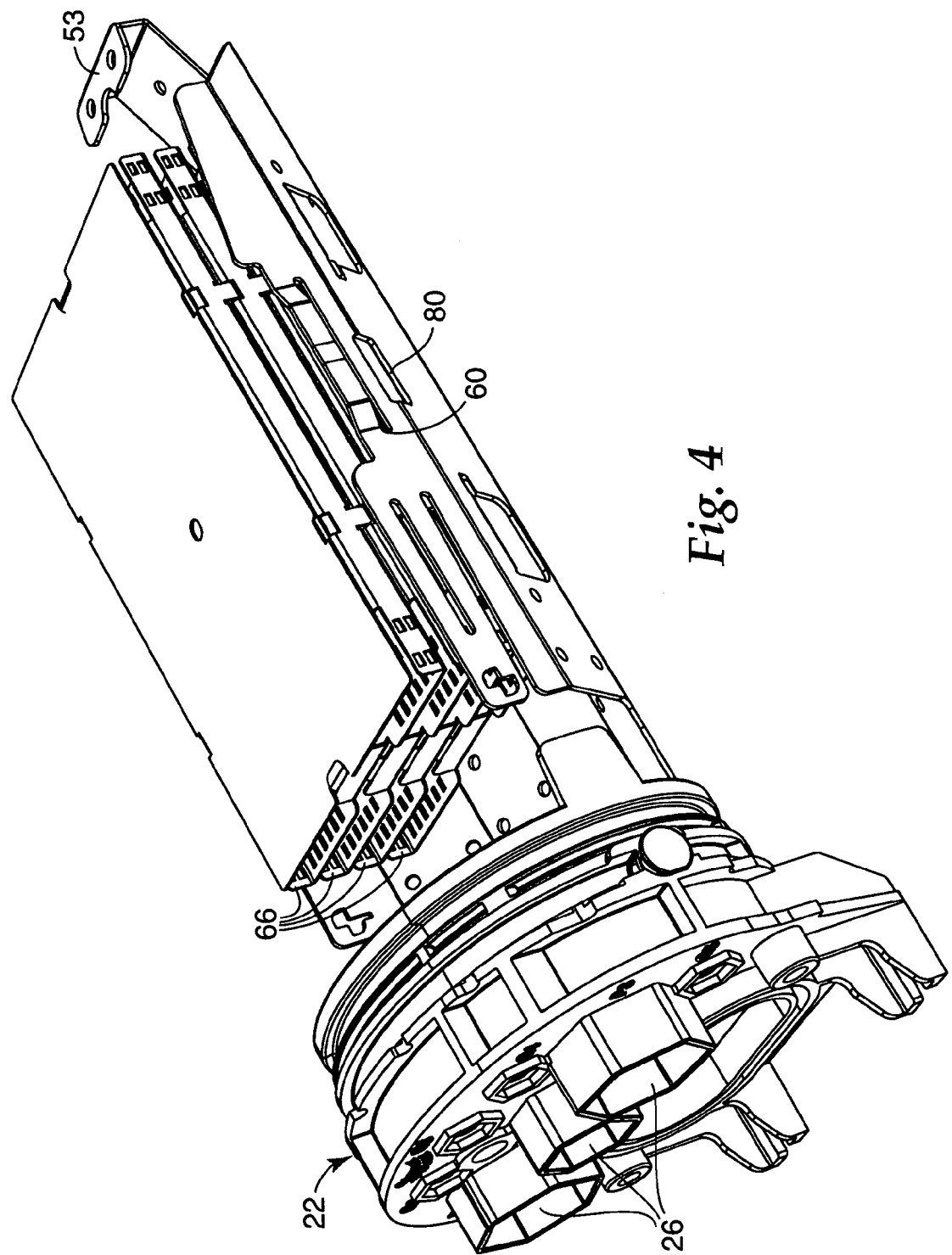
FIG. 4 is a perspective illustration of the support frame and base of FIG. 3 showing the support frame filled with splice trays.

Referring to FIGS. 3–4, the support basket 50 is shown using stackable splice trays 66. Support basket 50 is provided with support tabs 70 that protrude into the interior of the support basket 50. Support tabs 70 serve as mounting or support points for flat splice trays 66 as are known in the art. In the illustrated embodiment, the support tabs 70 are positioned such that a plurality of flat splice trays 66 may be supported in a stacked manner. The number of splice trays 66 that can be supported depends on the size of the support basket 50 and the size of splice trays 66. In the illustrated embodiment, up to four (4) splice trays 66 can be supported (see FIG. 4). In one embodiment, holes 72 in the support tabs 70 mate with protrusions (not shown) on the splice trays 66 and serve as locating features for the splice trays 66 and prevent the trays 66 from sliding after installation. The support tabs 70 also aid in maintaining separate splice areas 74 and telecommunication line slack storage areas 76 within the enclosure 20. In particular, upon installation of a splice tray 66 on the support tabs 70, a storage area 76 for excess lengths of telecommunication lines is formed between the splice tray 66 and the interior surface of the support basket 50. Excess lengths of telecommunication lines are thus easily accessible, but simultaneously prevented from interfering with splicing of telecommunication lines on the splice trays 66. Holes or slots 78 in the support basket 50 may be used to secure slack telecommunication line loops with for example, cable ties or other means known in the art. The splice trays 66 may be secured to the support basket 50 in any conventional manner. In one embodiment, slots 80 on the side of the support basket 50 may be used for mounting a strap (not shown) or other securing means which secures the splice trays 66 to support basket 50. In other embodiments, means other than or in addition to support tabs 70 may be used or provided to support trays 66. For example, mounting brackets (not shown) may be secured to support basket 50, where different mounting brackets may be provided with different tray configurations.

Figure 9:
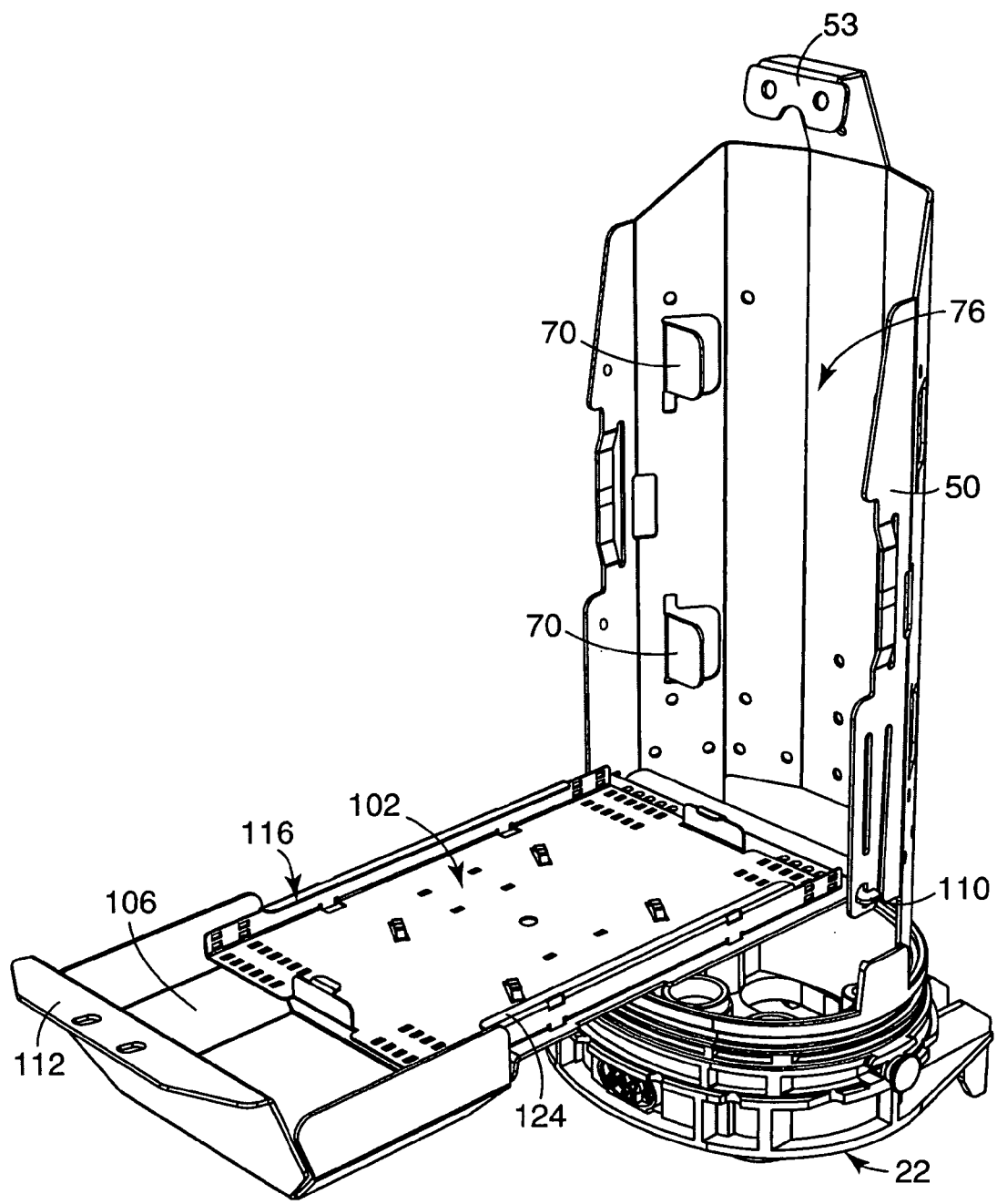
FIG. 9 is a perspective illustration of the enclosure of FIG. 8, showing the pivot tray positioned to allow access to the closure compartment.
Figure 10:
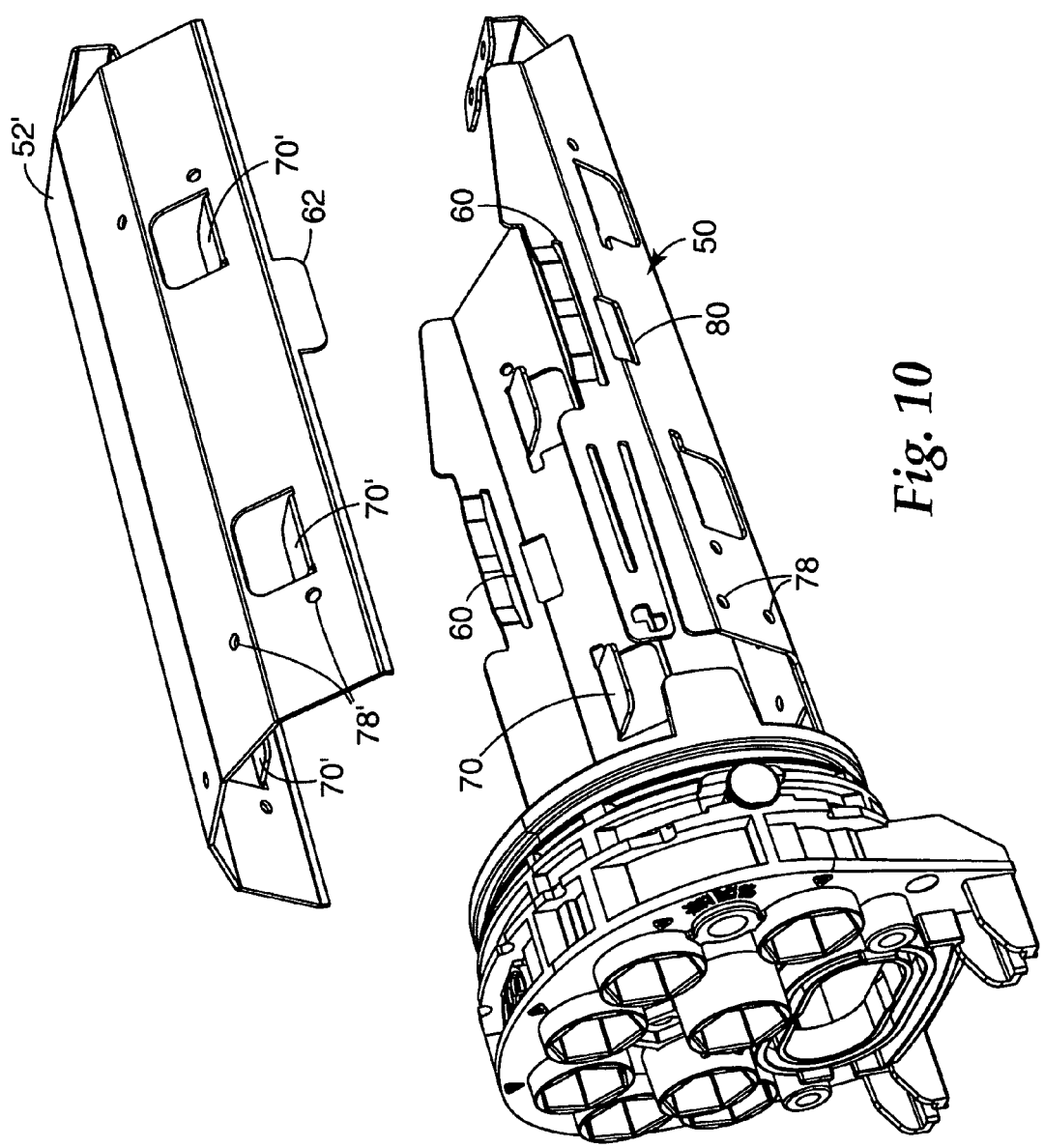
FIG. 10 is a perspective illustration of an alternate support band configuration.

Referring now to FIG. 10, in one embodiment a support band 52' is configured to support, maintain and manage telecommunication lines and splices in a manner similar to support basket 50. In the embodiment illustrated in FIG. 9, support band 52' extends substantially the full length of support basket 50, and is configured similarly to support basket 50 to include support tabs 70', holes 78' and any other desired features for securing additional splice trays, telecommunication lines, and the like.

Figure 5:
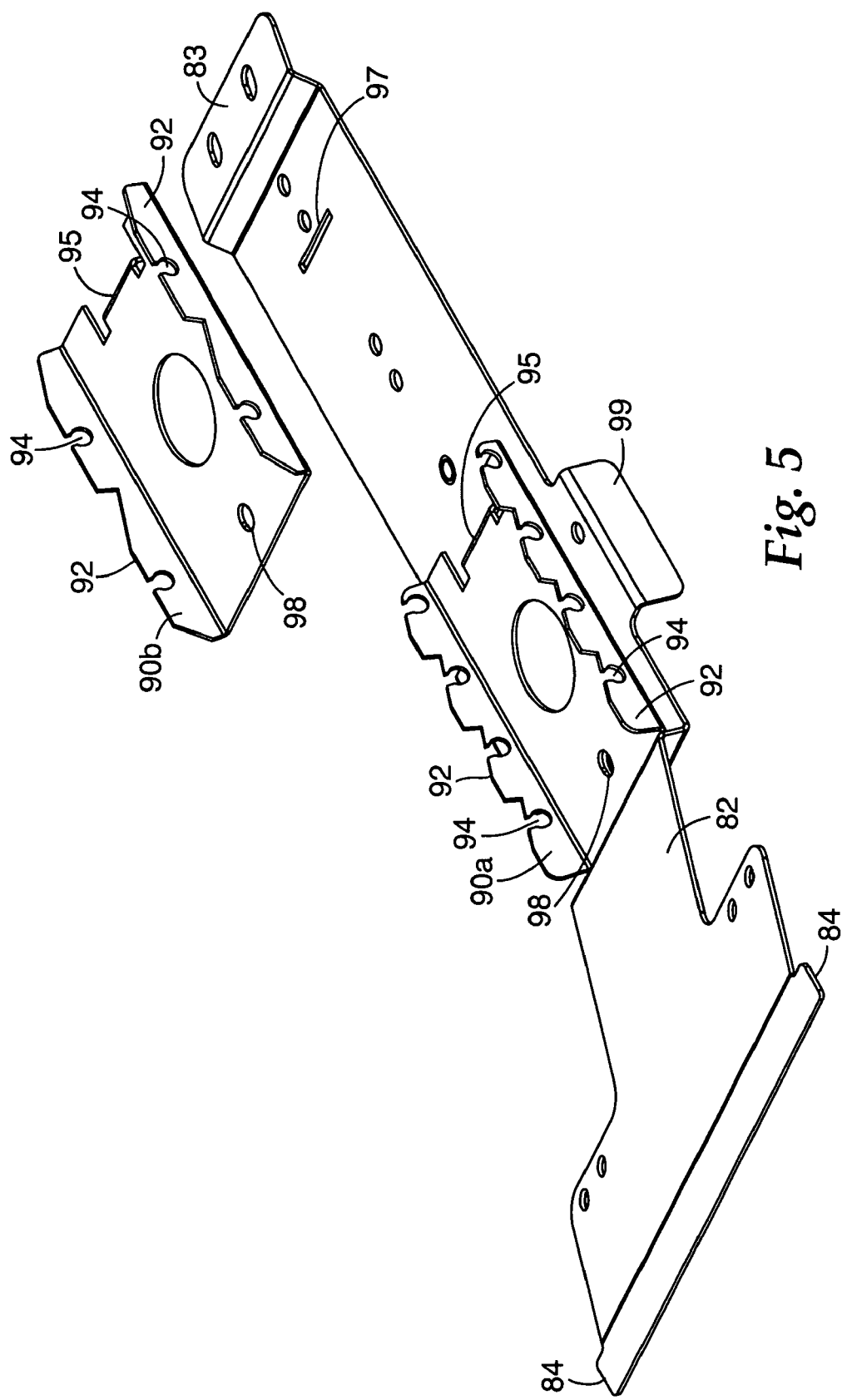
FIG. 5 is a perspective illustration showing a bracket for adapting the support frame of FIGS. 1–2 for use with hinged splice trays.
Figure 6:
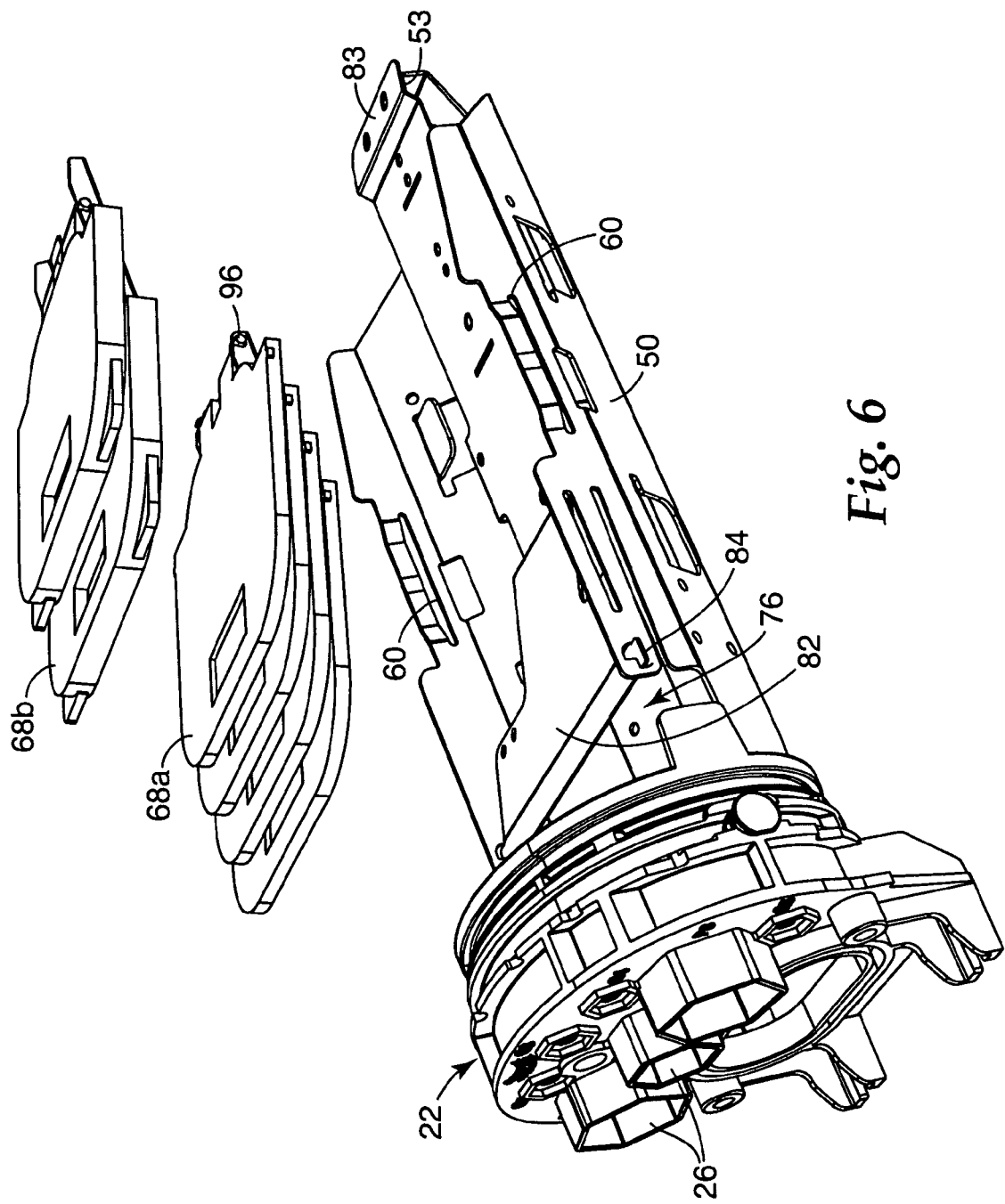
FIG. 6 is a perspective illustration showing the adaptor bracket of FIG. 5 installed in the support frame of FIG. 2 and receiving a plurality of hinged splice trays.
Figure 7:
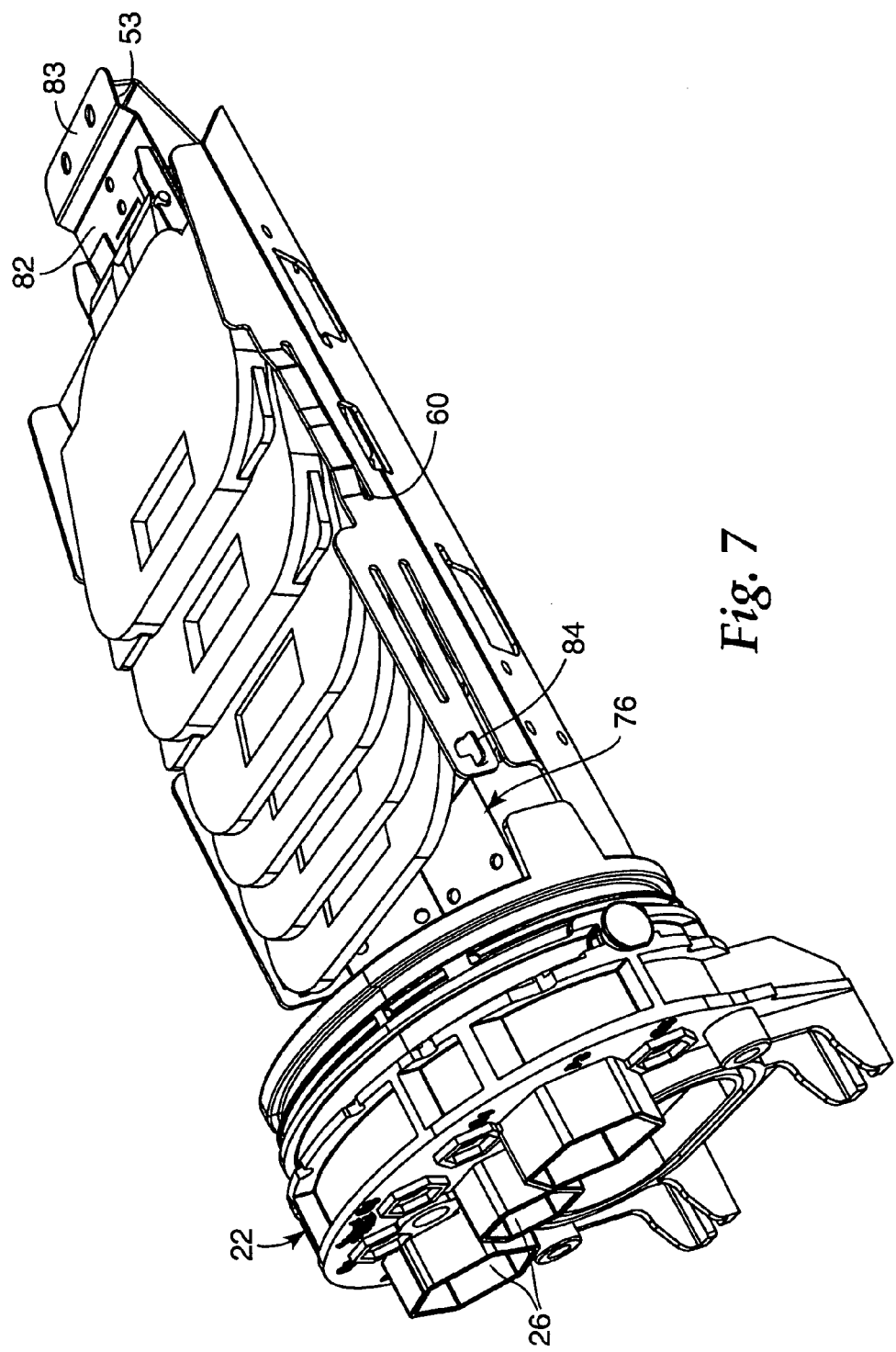
FIG. 7 is a perspective illustration showing the hinged splice trays of FIG. 6 assembled in the support frame.

Referring now to FIGS. 5–7, the support basket 50 is shown using hinged splice trays 68a, 68b (collectively splice trays 68). When used with hinged splice trays 68, an adaptor bracket 82 is installed in the support basket 50. The adaptor bracket 82 provides mounting features for the hinged splice trays 68, and further creates a telecommunication line slack storage section 76 underneath the bracket 82. The adaptor bracket 82 may be mounted on the support basket 50 using any suitable conventional means, such as screws, interlocking snaps, sliding engagement features, adhesive, etc.

In the illustrated embodiment, the adaptor bracket 82 is secured to the support basket 50 in a hinged manner. The adaptor bracket 82 includes lateral protrusions 84 near its bottom edge. The lateral protrusions 84 are configured to engage opposed openings 86 in the support basket 50 near the bottom of the support basket 50, such that adaptor bracket 82 may be rotated about the axis defined by the lateral protrusions 84. In one embodiment, at least one of openings 86 is provided with a slot 87 to capture a mating one of protrusions 84, such that the bracket 50 is held in an open position. In this manner, the slack telecommunication line storage area 76 under the adaptor bracket 82 may be easily accessed by rotating the bracket 82 and any splice trays 68 thereon out of the way. In addition, during installation and repair, a craftsman can completely remove the adaptor bracket 82 and any installed splice trays 68 to ease the creation of splices. In one embodiment, the top end 83 of the adaptor bracket 82 is configured to be secured to top end 53 of support basket 50 to prevent unintended rotation of the adaptor bracket 82. In one embodiment, the adaptor bracket 82 and support basket 50 may be secured together near the top of the support basket 50, such as by a retaining screw and/or a security wire, to prevent unauthorized access to the slack telecommunication line storage area 76.

In one embodiment, the mounting features of the adaptor bracket 82 allow more than one type or size of hinged splice tray 68 to be attached to the adaptor bracket 82. For example, the adaptor bracket 82 may be configured to allow mounting of 5 mm thick splice trays 68a and/or 10 mm thick splice trays 68b by selection of an appropriate mounting bracket 90a, 90b (collectively mounting brackets 90). With reference to FIG. 5, a mounting bracket 90a for four 5 mm thick hinged splice trays 68a and a mounting bracket 90b for two 10 mm thick hinged splice trays 68b are shown. Mounting brackets 90a, 90b include upturned opposed lateral edges 92 having grooves 94 shaped for snap engagement with pivot pins 96 extending from the splice trays 68a, 68b. Mounting brackets 90a, 90b are removably secured to adaptor bracket 82, such that the desired configuration of splice trays 68a, 68b (e.g., number and/or type of splice trays) held by the adaptor bracket 82 can be modified to suit a particular application. In one embodiment, each mounting bracket 90a, 90b includes a tab 95 extending from a top end which mounts in a corresponding slot 97 in the adaptor bracket 82 and thereby properly positions the mounting brackets 90a, 90b on the adaptor bracket 82. A retaining screw (not shown) extending through holes 98 at a bottom end of the mounting brackets 90a, 90b holds the brackets 90a, 90b in place. Mounting brackets 90a, 90b may alternately be secured to adaptor bracket 82 using any other suitable means. Beneficially, tabs 99 formed on bracket 82 allow management and securing of telecommunication lines to the bracket 82 before entering into the hinged splice trays. This provides the strain relief and organization of the telecommunication lines.

As telecommunication networks are expanded, two separate craft crews may need to work within the enclosure 20. First, construction crews (typically having higher levels of skill and training) install the enclosure 20, open the cable to expose the telecommunication lines therein, splice into the telecommunication lines, and make it ready for the final drop connection. At a later time, such as when a customer subscribes to a service, installation and repair crews (typically having lower levels of skill and training) install a final drop connection to the customer premise and turn the service on or off. Because of the differing skill levels between the crafts, it is desirable to provide craft separation to prevent unwanted or unauthorized access (either intentional or inadvertent) to the telecommunication lines and splices thereof to maintain and improve reliability and integrity of the network.

Figure 8:
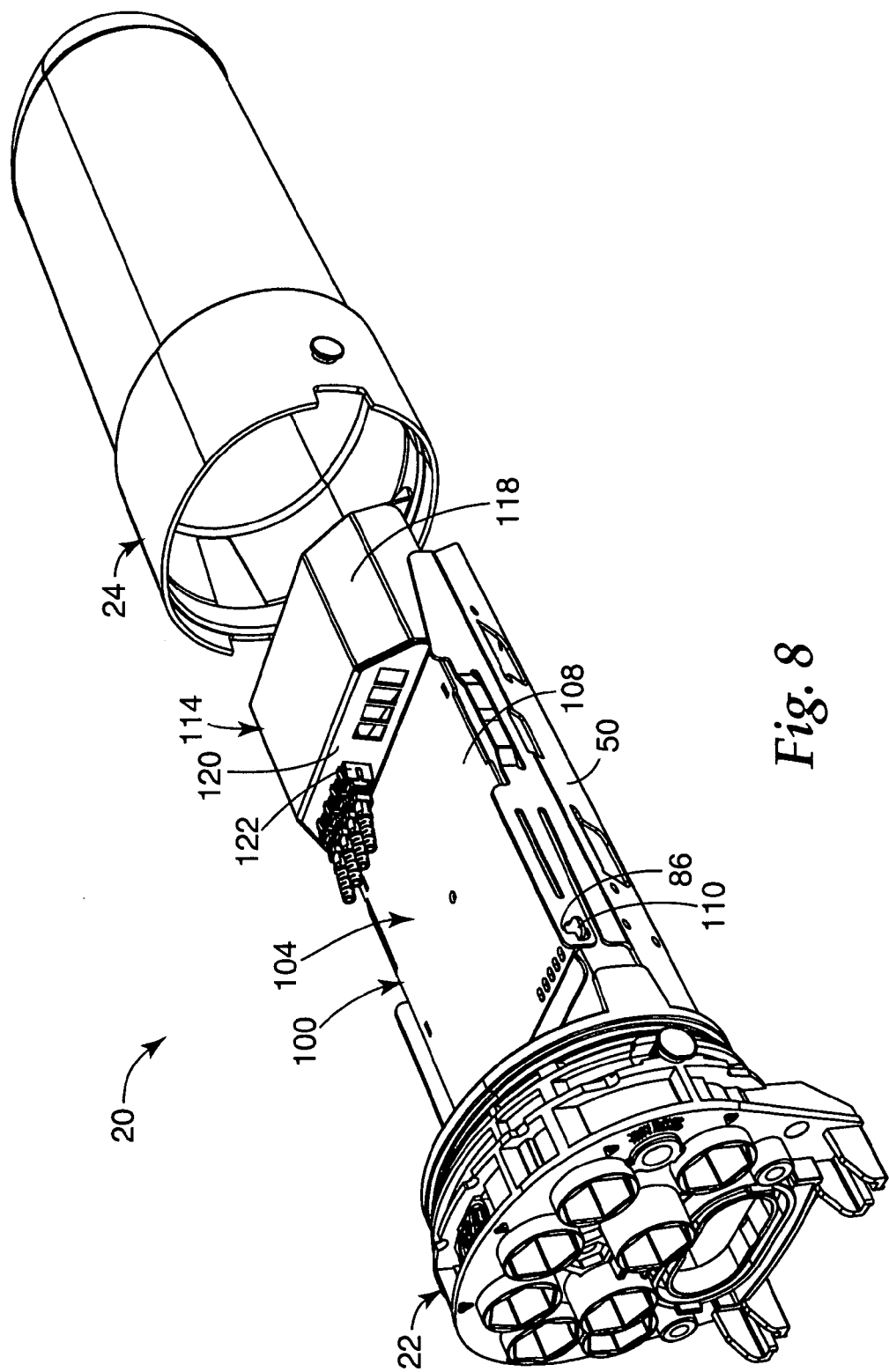
FIG. 8 is a perspective illustration of the enclosure and support frame of FIGS. 1–2 used with a pivot tray dividing the enclosure into separate closure and termination compartments.

Referring now to FIGS. 8–9, the support basket 50 as described above is shown as used with a pivot tray 100 providing separate splicing and drop connection areas, commonly referred to as closure compartment 102 and terminal compartment 104, respectively, within the enclosure 20. In FIG. 8 the pivot tray 100 is shown in the closed or "secured" position, while in FIG. 9 the pivot tray 100 is shown oriented in the open or "unsecured" position. Craft separation is provided in the enclosure 20 of FIGS. 8–9 by providing first compartment 102 (for splicing into the telecommunication lines of the cable) and a second compartment 104 (for establishing drop connections from the splice telecommunication lines). In particular, the pivot tray 100 separates and defines the first and second compartments 102, 104 on opposite sides of the pivot tray 100, such that first compartment 102 is adjacent a back side 106 of the pivot tray 100 and second compartment 104 is adjacent a front side 108 of the pivot tray 100. For purposes of description, the back side 106 of the pivot tray 100 is that side facing toward the support basket 50, while the front side 108 of the pivot tray 100 is that side facing away from the support basket 50. The first compartment 102 is only accessible when the pivot tray 100 is moved (e.g., by pivoting) into the open or unsecured position as shown in FIG. 9, while the second compartment is accessible simply by opening the enclosure, as by removing the housing 24 from the base 22.

The pivot tray 100 is pivotably mounted to the support basket 50 in a siilar manner as adaptor bracket 82 described above. In particular, the pivot tray 100 includes lateral protrusions 110 near its bottom edge. The lateral protrusions 110 are configured to engage opposed openings 86 in the support basket 50 near the bottom of the support basket 50, such that the pivot tray 100 pivots or rotates about the axis defined by the lateral protrusions 110 near the bottom of the support basket 50. The top end 112 of the pivot tray 100 is configured to be secured to the top 53 of the support basket 50, such as by a retaining screw and/or a security wire, to maintain pivot tray 100 in the closed or secured position and prevent unauthorized access to the closure compartment 102.

The pivot tray 100 includes connector mounting features 114 positioned on its front side 108, and splice forming, organization and management features 116 positioned on its back side. Referring to FIG. 8, the top portion of the front side 108 of pivot tray 100 is raised to form a routing compartment 118 and mounting face 120 for standard connector couplings 122, such as SC connector couplings. In one embodiment, the routing compartment 118 is configured to comply with bend radius requirements of optical fibers. Mounting face 120 may be angled relative to front side 108 to ease engagement and disengagement of connector couplings 122 and maximize space for the connector and its strain relief boot.

Referring to FIG. 9, a splice tray 124 is mounted on or integrally formed with the back side 106 of the pivot tray 100. Positioning the splice tray 124 on the back side 106 of the pivot tray 100 (instead of mounting the splice tray on the support tabs 70 of support basket 50, as shown and describe with respect to FIGS. 2–4) helps for easy routing of the connector pigtails from the splice tray 124 to the connector couplings 122 located in mounting face 120 on the front side 108 of the pivot tray 100. In addition, storage space 76 for slack telecommunication lines remains between the splice tray 124 on the back side 106 of the pivot tray 100 and the support basket 50 when pivot tray 100 is in the closed or secured position.

Figure 11A:
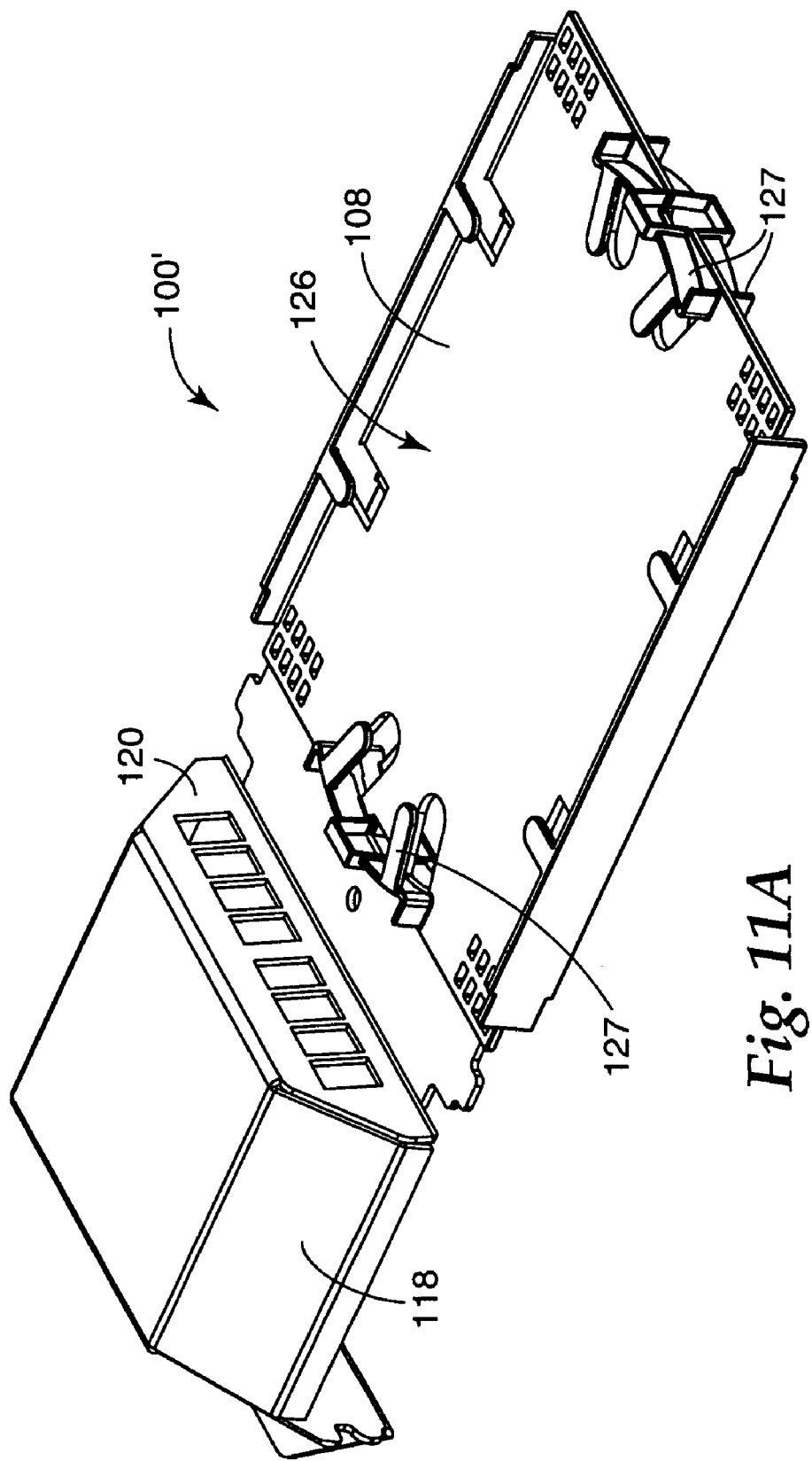
FIGS. 11A and 11B are perspective illustrations of a dual-sided splice tray usable in the enclosure of FIGS. 8 and 9.
Figure 11B:
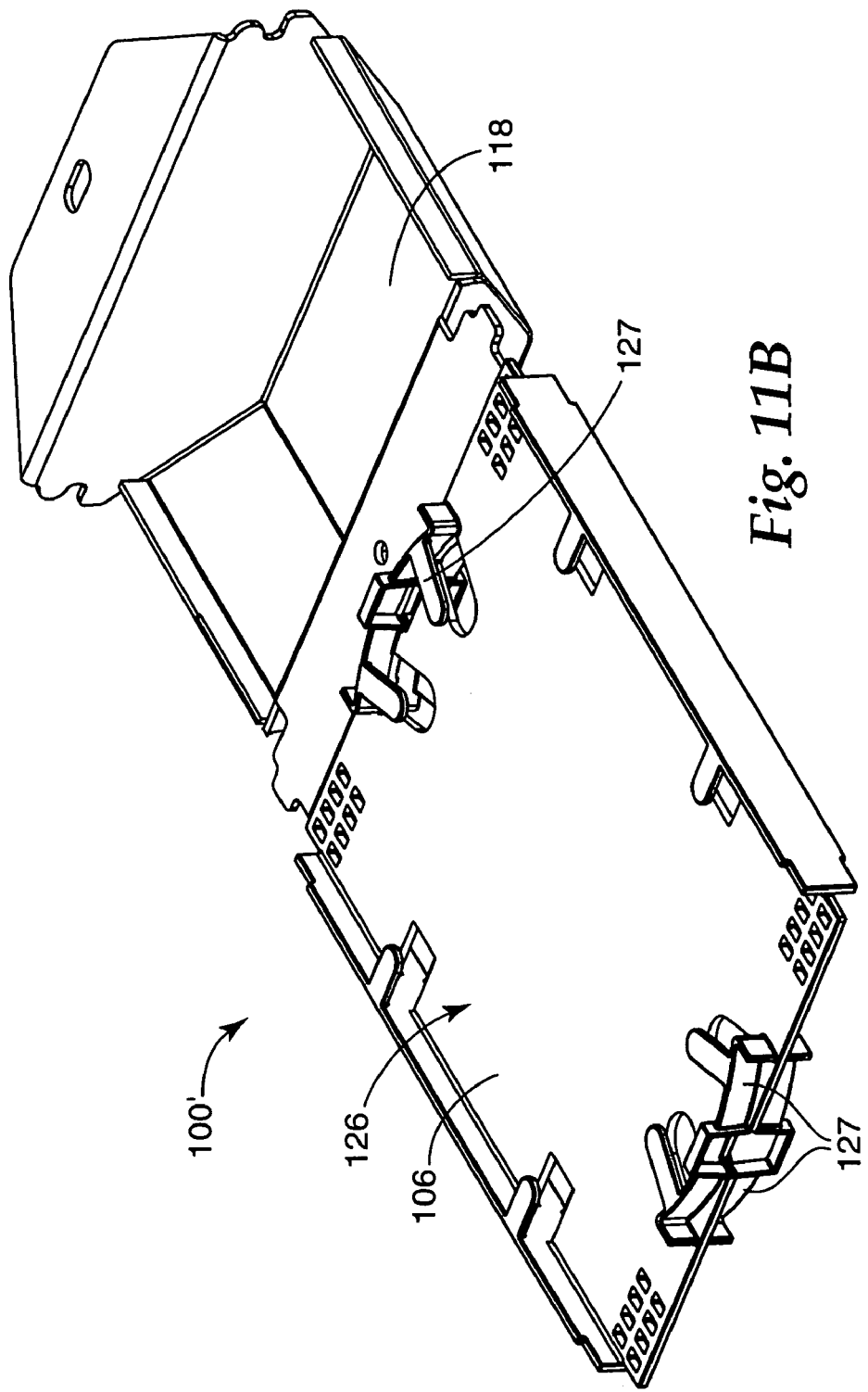

When establishing drop lines from the enclosure 20, several types of connections may be accommodated. Some drop cables may have pre-terminated pigtail connectors that can simply be plugged into the connector couplings 122 mounted onto the front (terminal compartment) side 108 of the pivot tray 100. Other drop cables may require a fusion or mechanical splice be formed between a pigtail connector fiber and the drop cable fibers. In this case, slack lengths of the pigtail connector fibers can be stored and managed on the flat front side 108 of the pivot tray 100. In one embodiment, a splice tray or splice holders can be mounted on or integrally formed with the front side 108 of the pivot tray 100 to allow splicing of the drop cable fibers to the pigtail fibers in the second (terminal) compartment. In one embodiment, as shown in FIGS. 11A and 11B, a pivot tray 100' includes a fiber management tray 126 having fiber retention structures 127 integrally formed on one of or both back side 106 and front side 108. Fiber retention structures 127 are configured for management and storage of telecommunication lines and elements thereof (e.g., holding loops of optical fiber and/or splice holders of the types known in the art). Fiber management tray 126 may also be configured to accept and retain one or more splice trays (not shown) of the types known in the art.

In one embodiment, optical components (e.g., 1×N or 2×N power splitters, WDM, CDWM, DWDM, switches, etc.) can be mounted in a splice tray 124 (FIGS. 3–7 and 9), held by fiber management trays 126 (FIGS. 11A and 11B), directly mounted on back side 102 of pivot tray 100, or directly mounted on the support basket 50 or in the first compartment 76 area using any suitable mounting means according to the application requirement.

In one embodiment, pivot tray 100 is formed with multiple rows of the couplings 122 to form a fiber distribution patch panel on front side 108 of pivot tray 100, and optical components can be mounted as described above on the back side 106 of pivot tray 100 to support fiber distribution point applications.

In other embodiments, a pigtail connection is made with the telecommunication line in the enclosure and routed to an external connector (e.g. an Optitap™ connector made by Corning) positioned in a port 26 of the base 22, thereby allowing drop connection without further opening of the enclosure 20.

The pivot tray 100 beneficially allows any enclosure 20 initially having only a single compartment to be converted to an enclosure 20 having separate closure and termination compartments 102, 104, respectively, where such separate compartments are necessary or desirable. Although the pivot tray 100 is illustrated with a particular support basket 50 having a support band 52, use of the pivot tray 100 is not so limited. In particular, the pivot tray 100 may be installed in any suitable enclosure 20, with or without a support basket 50. Where a support basket 50 is used, the configuration of the support basket 50 may be adapted to the particular size and shape of the enclosure 20, and use of a support band 52 as described herein is not required. For example, where deflection of the housing 24 is not a concern, pivot tray 100 may be used with a support basket 50 similar to that illustrated, but without the support band 52. Where deflection of the housing 24 is a concern, the support band 52 can be used. In other implementations, the pivot tray 100 may be pivotably mounted directly to the enclosure 20, without using a support basket 50.

In each of the embodiments and implementations described herein, the various components of the enclosure 20, support frame 40, and elements thereof are formed of any suitable material. The materials are selected depending upon the intended application and may include both polymers and metals. In one embodiment, the base 22 and housing 24 are formed of polymeric materials by methods such as injection molding, extrusion, casting, machining, and the like, while the support frame 40 and components thereof are formed of metal by methods such as molding, casting, stamping, machining the like. Material selection will depend upon factors including, but not limited to, chemical exposure conditions, environmental exposure conditions including temperature and humidity conditions, flame-retardancy requirements, material strength, and rigidity, to name a few.

Although described herein generally with respect to telecommunication cables, telecommunication lines, and telecommunication line splices, it is within the scope of the invention that the enclosure 20, support frame 40, pivot tray 100 and components thereof can be used and adapted to many diverse applications, including (but not limited to) telecommunication cables, electrical power cables, optical fiber cables, copper wire cables, drop lines, branch lines, distribution lines, pipes and conduits, to name a few.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An enclosure for receiving at least one telecommunications cable and for containing telecommunication lines and telecommunication line splices therein, the enclosure comprising:
   a housing longitudinally extending from an open first end to a closed second end, the housing defining an internal cavity extending in the longitudinal direction, the internal cavity having a circumferential shape in a direction transverse to the longitudinal direction;
   a base member configured for attachment to the open first end of the housing to provide an enclosed configuration, the base member defining at least one port configured for passage of at least one telecommunications cable therethrough;
   a support basket connected to the base member, wherein the support basket extends longitudinally within the internal cavity of the housing in the enclosed configuration, the support basket shaped to substantially conform to a first portion of the circumferential shape of the internal cavity; and
   a support band secured to the support basket, the support band shaped to substantially conform to a second portion of the circumferential shape of the cavity, wherein the support basket and the connected support band extend around substantially the entire circumference of the internal cavity.

2. The enclosure of claim 1, wherein the internal cavity has a generally oval circumferential shape in the transverse direction, and wherein the support basket and the support band each generally define a U-shape in the transverse direction.

3. The enclosure of claim 1, wherein the support basket extends longitudinally along substantially an entire length of the internal cavity.

4. The enclosure of claim 3, wherein the support band is positioned adjacent a region of the housing susceptible to deflection containing components desired to be protected from external pressure and impact forces.

5. The enclosure of claim 1, wherein the support band is releasably secured to the support basket.

6. The enclosure of claim 1, wherein the housing is formed of polymeric materials, and wherein the support basket and support band are formed from metal.

7. The enclosure of claim 1, wherein at least one of the support basket and the support band is configured to support telecommunication lines and splices.

8. The enclosure of claim 7, wherein the support basket is configured to carry splice trays selected from stackable splice trays and hinged splice trays.

9. The enclosure of claim 1, further comprising a rotatable tray carried by the support basket, the tray configured to define separate first and second compartments within the enclosure.

10. An enclosure for containing telecommunication lines and telecommunication line splices therein, the enclosure comprising:
    a housing longitudinally extending from an open first end to a closed second end, the housing defining an internal cavity extending in the longitudinal direction, the internal cavity having a circumference in a direction transverse to the longitudinal direction;
    a base member configured for separable attachment to the open first end of the housing to provide an enclosed configuration;
    a support frame secured to the base member and extending longitudinally within the internal cavity of the housing in the enclosed configuration, wherein the support frame includes at least one portion that provides support about substantially the entire circumference of the internal cavity at a location between the first end and the second end of the housing.

11. The enclosure of claim 10, wherein the support frame comprises a support basket and a support band releasably secured to the support basket.

12. The enclosure of claim 11, wherein support basket and the support band form the support frame portion that substantially conforms to the entire circumference of the internal cavity.

13. The enclosure of claim 12, wherein the support basket and support band are slidably received in the housing.

14. The enclosure of claim 13, wherein the housing is a dome-shaped housing and the internal cavity has a substantially oval circumference.

15. The enclosure of claim 10, wherein the base member includes at least one port configured for passage of at least one telecommunications cable therethrough into the internal cavity of the housing.

16. A frame for supporting telecommunication lines and splices within an enclosure, the enclosure of the type having a housing longitudinally extending from an open first end to a closed second end and a base member configured for separable attachment to the open first end of the housing to provide an enclosed configuration, wherein the housing defines an internal cavity extending in the longitudinal direction, and wherein the internal cavity has a circumferential shape in a direction transverse to the longitudinal direction, the frame comprising:
    a support basket shaped to substantially conform to a first portion of the circumferential shape of the internal cavity and configured for connection to the base member, wherein the support basket extends longitudinally within the internal cavity of the housing in the enclosed configuration; and
    a support band secured to the support basket, the support band shaped to substantially conform to a second portion of the circumferential shape of the cavity, wherein the support basket and support band secured thereto extend around substantially the entire circumference of the internal cavity.

17. The frame of claim 16, wherein the support basket is shaped to extend longitudinally along substantially an entire length of the internal cavity in the enclosed configuration.

18. The frame of claim 17, wherein support basket substantially conforms to the shape of the internal cavity adjacent the support basket.

19. The frame of claim 18, wherein the support band substantially conforms to the shape of the internal cavity adjacent the support band.

20. The frame of claim 16, wherein the support band is removably secured to the support basket.

* * * * *